(12) United States Patent
Jabbari

(10) Patent No.: US 6,430,007 B1
(45) Date of Patent: Aug. 6, 2002

(54) AIR-ACTIVATED SPINDLE/DISK PACK LOCKING SYSTEM

(75) Inventor: Iraj Jabbari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,497

(22) Filed: Jul. 15, 1999

(51) Int. Cl.[7] .................................................. G11B 5/54
(52) U.S. Cl. ................................................... 360/256.1
(58) Field of Search ............................. 360/256, 256.1, 360/256.2, 256.3, 256.4, 256.6

(56) References Cited

U.S. PATENT DOCUMENTS

| | | | |
|---|---|---|---|
| 4,331,989 A | | 5/1982 | Viskochil |
| 4,497,002 A | | 1/1985 | Von Der Heide et al. |
| 5,448,436 A | | 9/1995 | Albrecht |
| 5,734,527 A | | 3/1998 | Reinhart |
| 5,999,370 A | * | 12/1999 | Stone et al. ................. 360/105 |
| 5,999,371 A | * | 12/1999 | Wood et al. ................. 360/105 |
| 6,212,029 B1 | * | 4/2001 | Fioravanti ................. 360/97.01 |

OTHER PUBLICATIONS

IBM Tech. Disclosure Bulletin/"Disk Spindle Storage and Transit Lock"/vol. 29, Nno. 2, Jul. 1986.
IBM Tech. Disclosure Bulletin/"Actuator Brake"/vol. 35, No. 1A, Jun. 1992.

* cited by examiner

Primary Examiner—George J. Letscher
(74) Attorney, Agent, or Firm—Robert B. Martin; Bracewell & Patterson, L.L.P.

(57) ABSTRACT

A disk drive has a brake mechanism located adjacent to its disk pack and actuator. The brake is pivotally mounted and movable into contact with the disks and actuator. Each end of brake has a bumper for cushioning the impact between the components and enhancing friction. A spring is used to bias the brake into contact with the disks. The brake is active or locked against the disks by the spring in the absence of air flow circulation from the rotation of the disks. The brake prevents disk from rotating and excessive movement or vibration. The brake deactivates or opens as a result of the air flow generated by the rotation of the disks. The air flow is sufficient to overcome the force generated by the spring.

20 Claims, 2 Drawing Sheets

AIR-ACTIVATED SPINDLE/DISK PACK LOCKING SYSTEM

BACKGROUND OF THE INVENTION

1. Technical Field

This invention relates in general to hard disk drive units and in particular to a system for reducing excess movement of the disks in a drive unit when it is not in use.

2. Background Art

In magnetic disk drives, the product of head load and the parking radius produces a torque known as the break away torque. The spindle motor overcomes this torque in order to proceed to other operational activities. The break away torque is a function of the number of interfaces between the head and the media, the coefficient of friction, and the parking radius. Break away torque is also affected by environmental conditions, the number of crash stop/start (CSS) cycles performed, and time. As the requirements for enduring CSS cycles increase, load-unload mechanisms for disk drives, such as ramps, are becoming more popular. Load/unload mechanisms reduce concerns of head media interaction during take-off and landing, and damage to the unit during shipping and/or handling.

However, once the break away torque is overcome, the disk pack assembly is free to move in oscillatory motions due to any disk pack imbalances and its inertia. This oscillatory motion is transmitted to the spindle motor bearing system and can damage the bearings and create higher acoustical levels in the disk pack. Thus, an apparatus and method for reducing or eliminating excessive oscillatory motion of the disks is needed.

SUMMARY OF THE INVENTION

A disk drive has a brake mechanism located adjacent to its disk pack and actuator. The brake is pivotally mounted and movable into contact with the disks and actuator. Each end of brake has a bumper for cushioning the impact between the components and enhancing friction. A spring is used to bias the brake into contact with the disks. The brake is active or locked against the disks by the spring in the absence of air flow circulation from the rotation of the disks. The brake prevents disk from rotating and excessive movement or vibration. The brake deactivates or opens as a result of the air flow generated by the rotation of the disks. The air flow is sufficient to overcome the force generated by the spring.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
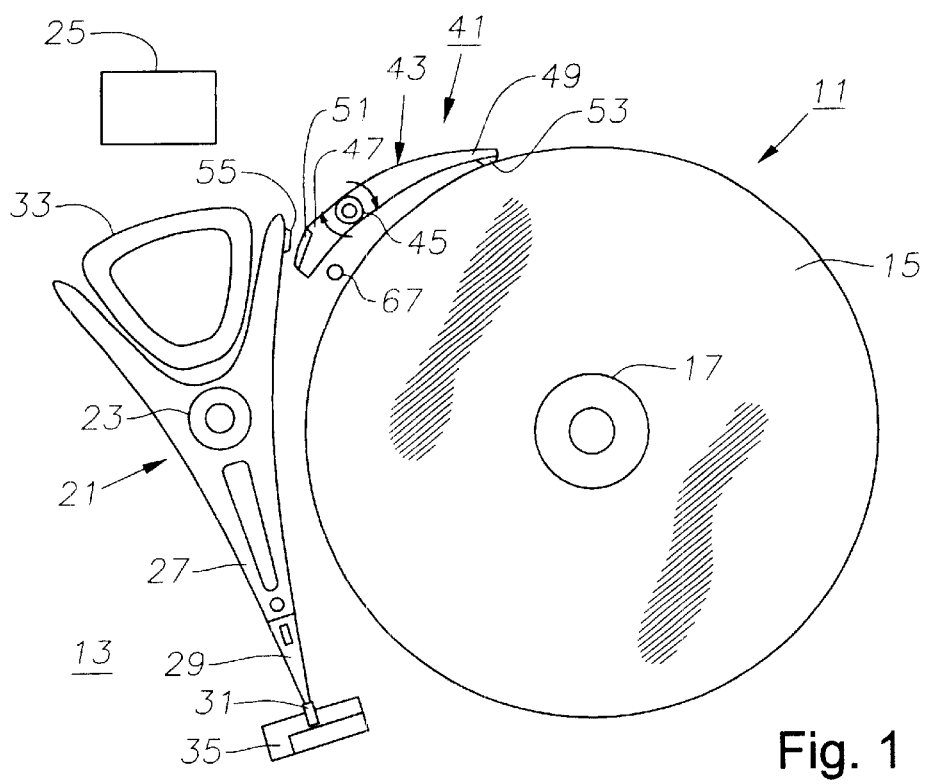
FIG. 1 is a plan view of a disk drive having an air brake constructed in accordance with the invention and shown in an unload position.

Referring to FIG. 1, an information storage system comprising a hard disk drive 11 is shown. Drive 11 has a base 13 containing a plurality of stacked, parallel magnetic disks 15 (one shown) which are closely spaced apart. Disks 15 are rotated counterclockwise (see arrows) by a spindle motor located therebelow about a central drive hub 17. An actuator 21 is rotatably mounted to base 13 about a pivot assembly 23. A controller 25 is mounted to base 13 for selectively moving actuator 21 as will be described below.

Actuator 21 has a mounting support 27, a pair of parallel, cantilevered load beams or suspensions 29 extending from mounting support 27, and a head gimbal assembly 31 having at least one magnetic read/write head secured to each suspension 29 for magnetically reading data from or magnetically writing data to disks 15. Suspensions 29 have a spring-like quality which biases or maintains them in parallel relationship relative to one another. A motor assembly 33 having a conventional voice coil motor is also mounted to pivot assembly 23 opposite head gimbal assemblies 31. Actuator 21 pivotally moves head gimbal assemblies 31 radially across tracks on the disks 15 until the heads on assemblies 31 settle on the target tracks. A load/unload mechanism or ramp 35 is located adjacent to disk 15 for parking actuator 21.

Figure 2:
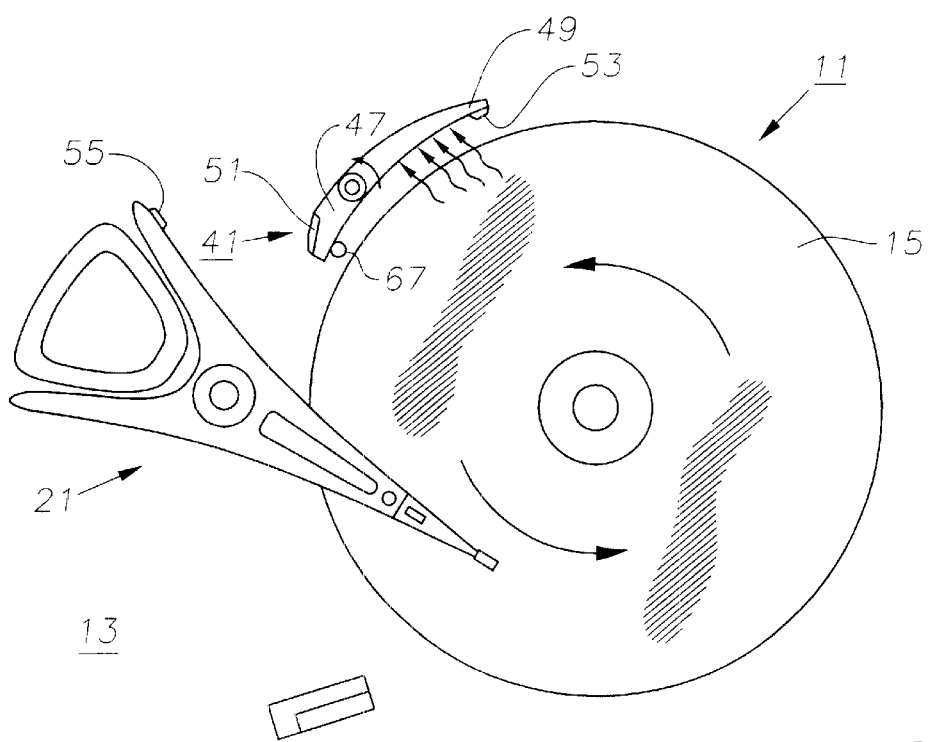
FIG. 2 is a plan view of the disk drive of FIG. 1 in a load position.
Figure 3:
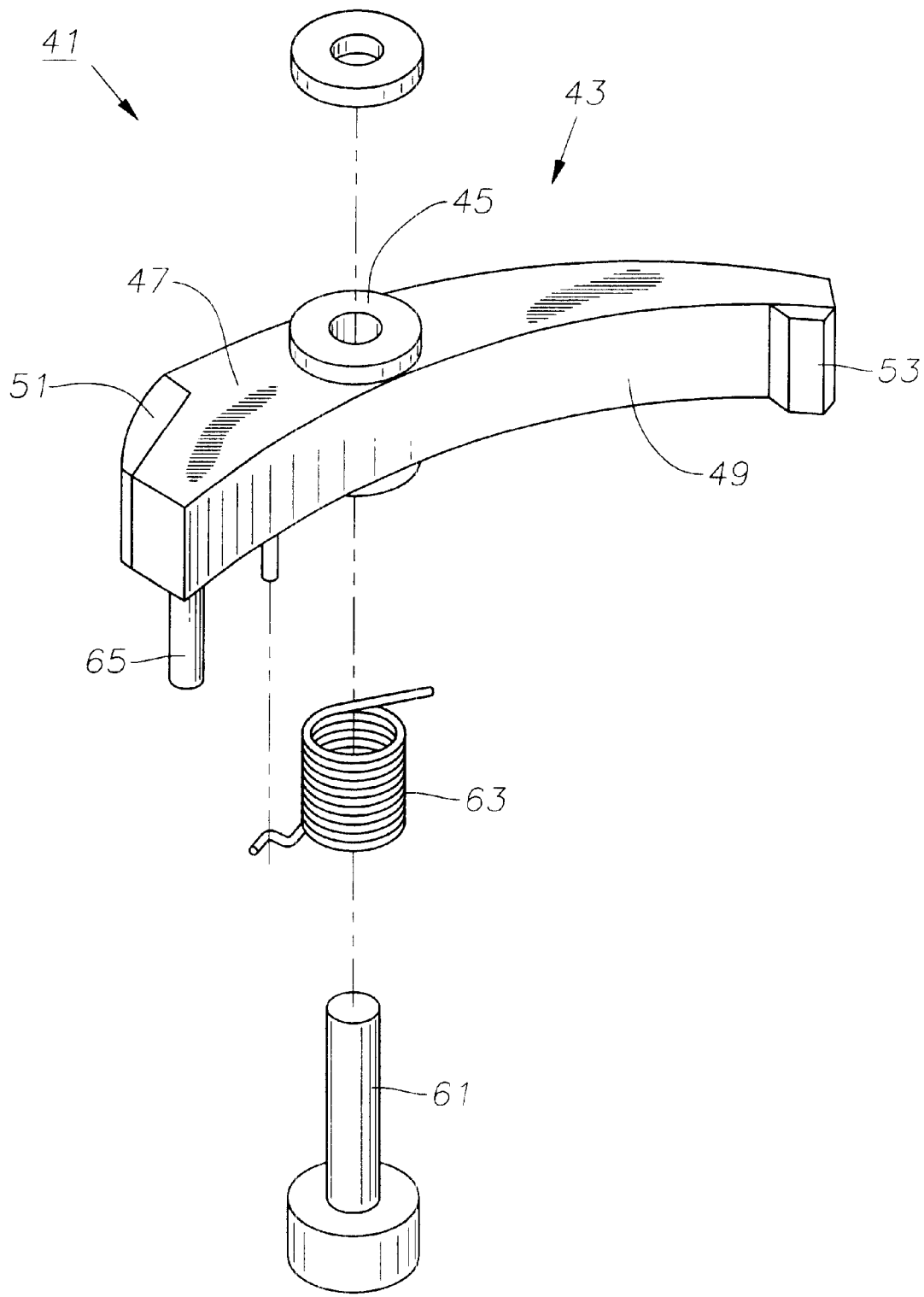
FIG. 3 is an exploded isometric view of the air brake of FIG. 1.

As shown in FIGS. 1–3, a locking system 41 is mounted to base 13 adjacent to disk 15 and actuator 21. System 41 has a generally elongated member or brake 43 having a central hub 45, a short actuator arm 47, and a longer disk arm 49. Brake 43 is preferably formed from polycarbonate or like materials. Both arms 47, 49 extend from hub 45, but in generally opposite directions. These elements may be shaped or contoured for many different applications and configurations. The end of each arm 47, 49 is fitted with an elastomeric bumper 51, 53, respectively. Bumpers 51, 53 provide arms 47, 49 with a soft but resilient surface for contacting actuator 21 and disk 15, respectively, and enhance friction between the components, particularly between arm 49 and disk 15. Alternatively, the end of actuator 21 that contacts brake 43 also may be fitted with a bumper 55 for the same purpose. Bumpers 51, 55 are designed for the same purpose of cushioning the contact between brake 43 and actuator 21 and enhancing friction between the components. Preferably, each of bumpers 51, 53, 55 would be overmolded on their respective support members.

Brake 43 is mounted to base 13 on a pivot pin 61 (FIG. 3) that extends perpendicularly upward therefrom. A torsion spring 63 is mounted between brake 43 and pin 61 for biasing the disk arm 49 of brake 43 clockwise (see arrow), or into contact with disk 15. Spring 63 is required to produce only a few grams of force to sufficiently bias brake 43. Note that although only one disk 15 is shown, brake 43 is sufficiently large to contact each of the disks in a disk pack simultaneously. A stop pin 65 (FIG. 3) extends downward from actuator arm 47 of brake 43 for movement in a shallow recess (not shown) in base 13. Alternatively, a stop pin 67 extending upward from base 13 may be provided for contacting actuator arm 47. Each of these embodiments is designed to limit the counterclockwise motion of brake 43.

In operation, a simulated break away torque is achieved with locking system 41. Brake 43 is active or locked against disk 15 by spring 63 in the absence of air flow circulation from the rotation of disk 15. In this position (FIG. 1) bumper 53 on disk arm 49 of brake 43 is in contact with the outer, circumferential edge of disk 15 or disk pack assembly, thereby simulating the effect of the break away torque to the bearing structure (not shown) of the spindle motor. The contact between brake 43 and disk 15 prevents disk 15 from;rotating and excessive movement or vibration, especially with the soft, friction-enhancing material of bumper 53. Locking system 41 will deactivate or open (FIG. 2) as a result of the counterclockwise air flow (see small arrows) generated by the rotation of disk 15, along with movement of actuator 21 to its operational position.

At start up (prior to rotating disk 15), actuator 21 is pivoted slightly clockwise while resting in its parked position on ramp 35 (FIG. 1). In this position, bumper 55 on actuator 21 gently abuts bumper 51 on actuator arm 47 of brake 43 to pivot disk arm 49 and create a small separation between bumper 53 and disk 15. This clearance allows disk 15 to start rotating. Once disk 15 reaches operating speed, the air flow it generates is sufficient to overcome the force generated by spring 63, and brake 43 is suspended in or pushed away to its noncontacting position (FIG. 2). One of stop pins 65, 67 prevents actuator arm 47 from overpivoting into contact with disk 15. When disk 15 is at its operating speed, locking system 41 is fully deactivated or open, and is away from disk 15. Actuator 21 is free to perform its function in this mode.

The invention has several advantages. The brake reduces and/or eliminates oscillations and excessive movement or vibration of the disk pack and spindle when the disk drive is not in operation. During operation, the brake allows the disk pack to operate unimpeded. The soft, resilient bumpers utilized by the system enhance friction between the components and cushion their contact.

While the invention has been shown or described in only some of its forms, it should be apparent to those skilled in the art that it is not so limited, but is susceptible to various changes without departing from the scope of the invention.

I claim:

1. A disk drive, comprising:
   a base;
   a media disk rotatably mounted to the base and having a plurality of read/write tracks;
   an actuator pivotally mounted to the base and having a read/write head for interfacing the tracks of the media disk;
   a controller mounted to the base for coordinating movements of the media disk and the actuator;
   a brake mounted to the base adjacent to the media disk, the brake having an engaged position wherein it contacts the media disk when the media disk is not in operation to reduce excessive movement thereof, and a disengaged position wherein the brake is free of contact with the media disk when the media disk is in operation to allow unimpeded movement thereof; and wherein
   the brake is moved between the engaged and disengaged positions without the consumption of additional electrical energy.

2. The disk drive of claim 1 wherein the brake contacts an outer circumferential edge of the disk while in the engaged position.

3. The disk drive of claim 1 wherein the brake is pivotally mounted to the base.

4. The disk drive of claim 1 wherein the actuator contacts the brake to move it from the engaged position to the disengaged position.

5. The disk drive of claim 4, further comprising a bumper on the actuator for enhancing friction and cushioning the contact between the brake and the actuator.

6. The disk drive of claim 1, further comprising a spring mounted between the base and the brake for biasing the brake to the engaged position.

7. The disk drive of claim 1, further comprising a bumper on the brake for enhancing friction and cushioning the contact between the brake and the disk.

8. The disk drive of claim 1 wherein air flow generated by rotation of the disk directly impinges on the brake and maintains the brake in the disengaged position during operation.

9. The disk drive of claim 1, further comprising a stop pin mounted to one of the brake and the base for limiting movement of the brake in the disengaged position.

10. A disk drive, comprising:
    a base;
    a plurality of media disks rotatably mounted to the base, each having a plurality of read/write tracks;
    an actuator pivotally mounted to the base and having a plurality of read/write heads for interfacing the tracks on respective one of the media disks;
    a controller mounted to the base for coordinating movements of the media disks and the actuator;
    a brake pivotally mounted to the base adjacent to the media disks, the brake having an engaged position wherein it contacts an outer circumferential edge of each of the media disks when the media disks are not in operation to prevent rotation thereof, and a disengaged position wherein the brake is free of contact with the media disks when the media disks are in operation to allow unimpeded movement thereof; and wherein
    actuator contacts the brake to move it from the engaged position to the disengaged position at start-up.

11. The disk drive of claim 10, further comprising a bumper on the actuator for cushioning the contact between the brake and the actuator.

12. The disk drive of claim 10, further comprising a bumper on the brake for enhancing friction and cushioning contact between the brake and the media disks.

13. The disk drive of claim 12 wherein the bumper is formed from elastomeric material.

14. The disk drive of claim 10, further comprising a spring mounted between the base and the brake for biasing the brake to the engaged position.

15. The disk drive of claim 10 wherein air flow generated by rotation of the disks maintains the brake in the disengaged position during operation after start-up.

16. The disk drive of claim 10, further comprising a stop pin mounted to one of the brake and the base for limiting movement of the brake in the disengaged position.

17. A disk drive, comprising:
    a base;
    a plurality of magnetic media disks rotatably mounted to the base, each having a plurality of read/write tracks;
    an actuator pivotally mounted to the base and having a plurality of magnetic: read/write heads for interfacing the tracks on respective one of the media disks;
    a brake pivotally mounted to the base adjacent to the media disks, the brake having an engaged position wherein it contacts an outer circumferential edge of each of the media disks when the media disks are not in operation to prevent rotation thereof, and a disengaged position wherein the brake is free of contact with the media disks when the media disks are in operation to allow unimpeded movement thereof; wherein
    the actuator contacts the brake to move it from the engaged position to the disengaged position at start-up, and wherein air flow generated by rotation of the media disks maintains the brake in the disengaged position during operation after start-up;

a first elastomeric bumper on one of the brake and the actuator for cushioning contact between the brake and the actuator; and a second elastomeric bumper on the brake for enhancing friction and cushioning contact between the brake and the media disks.

18. The disk drive of claim 17, further comprising a spring mounted between the base and the brake for biasing the brake to the engaged position.

19. The disk drive of claim 17, further comprising a stop pin mounted to one of the brake and the base for limiting movement of the brake in the disengaged position.

20. The disk drive of claim 17 wherein the brake is mounted to a pivot pin that is parallel to an axis of rotation of the disk, the brake having a first arm extending in a first direction from the pivot pin for contacting the circumferential edge of the disk, and the brake having a second arm extending in a second direction for contact with the actuator.

* * * * *